(12) United States Patent
Lind et al.

(10) Patent No.: US 6,544,660 B1
(45) Date of Patent: *Apr. 8, 2003

(54) HEAT SHRINKABLE BARRIER BAGS

(75) Inventors: Keith D. Lind, Appleton, WI (US); John Eckstein, Neenah, WI (US); Robert J. Blemberg, Appleton, WI (US); Roger L. Kaas, Neenah, WI (US); George H. Walbrun, Menasha, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/573,596

(22) Filed: May 18, 2000

Related U.S. Application Data

(63) Continuation of application No. 09/105,623, filed on Jun. 26, 1998, now Pat. No. 6,074,715, which is a continuation-in-part of application No. 08/886,881, filed on Jul. 2, 1997, which is a continuation of application No. 08/653,520, filed on May 15, 1995, now abandoned, which is a continuation of application No. 08/082,226, filed on Jun. 24, 1993, now abandoned.

(51) Int. Cl.[7] .......................... B32B 27/32; B32B 27/08
(52) U.S. Cl. ....................... 428/516; 428/518; 428/520; 428/910; 428/34.9; 428/36.6; 428/36.7
(58) Field of Search ............................... 428/35.4, 34.9, 428/36.6, 36.7, 515, 516, 518, 520, 910

(56) References Cited

U.S. PATENT DOCUMENTS 6,074,715 A * 6/2000 Lind et al. ................. 428/35.4

OTHER PUBLICATIONS

"A new family of linear ethylene polymers provides enhanced sealing performance"; Van der Sanden et al. Tapi Journal, pp 99–103, Feb. 1999.*

* cited by examiner

Primary Examiner—D. Lawrence Tarazano
(74) Attorney, Agent, or Firm—McDermott, Will & Emery

(57) ABSTRACT

Films comprising a first layer, composition of said first layer comprising a blend of an ethylene vinyl acetate copolymer; linear low density polyethylene; a second ethylene vinyl acetate copolymer; and slip; a second layer, composition of said second layer comprising ethylene vinyl acetate copolymer and wherein each first and second layer having two surfaces; a third layer, composition of said third layer comprising vinylidene chloride methyl acrylate and wherein said third layer is disposed between said first and second layer; a fourth layer, composition of said fourth layer being the same as said first layer wherein said fourth layer is adhered to said first layer on the surface opposite said third layer; and a fifth layer, composition of said fifth layer comprising a blend of linear low density polyethylene and low density polyethylene wherein said fifth layer is adhered to said second layer on the surface opposite said third layer are provided for.

8 Claims, 1 Drawing Sheet

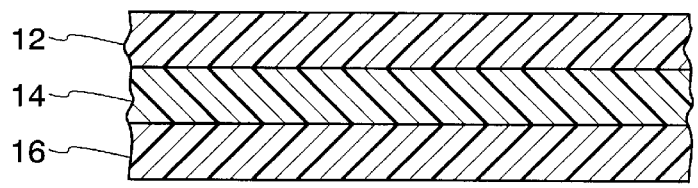
Fig. 1
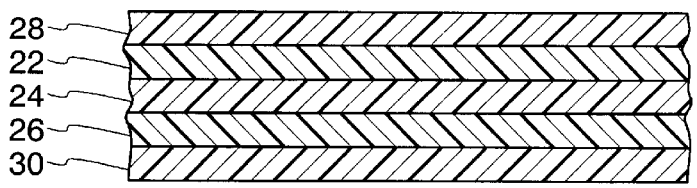
Fig. 2
Primary Metallocene Catalysts
Fig. 3
NON-STEREOSELECTIVE
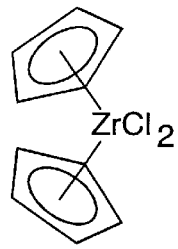
Fig. 4
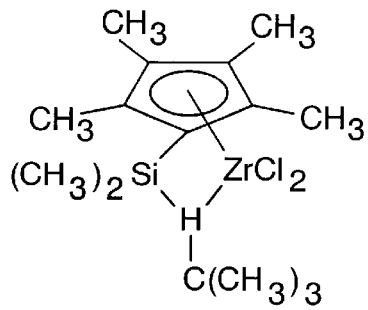
Fig. 5
STEREOSELECTIVE
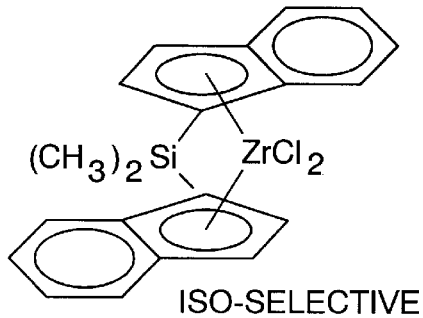
ISO-SELECTIVE
Fig. 6
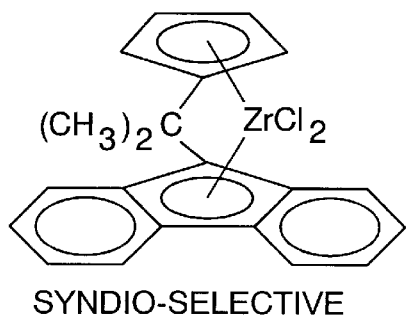
SYNDIO-SELECTIVE

HEAT SHRINKABLE BARRIER BAGS

This application is a continuation of U.S. patent application Ser. No. 09/105,623 filed Jun. 26, 1998 (U.S. Pat. No. 6,074,715), which is a continuation-in-part of co-pending U.S. patent application Ser. No. 08/886,881, filed Jul. 2, 1997 (pending); which is a continuation of U.S. patent application Ser. No. 8/653,520, filed May 15, 1995 (abandoned); which is a continuation of U.S. patent application Ser. No. 08/082,226, filed Jun. 24, 1993 (abandoned).

BACKGROUND OF THE INVENTION

Polymeric materials have many applications in packaging structures. They are used as films, sheets, lidstock, pouches, tubes and bags. These polymeric materials may be employed as a single layer or one or more layers in a structure. Unfortunately, there are countless polymeric materials available. Furthermore, resin suppliers frequently have a tendency to claim many more applications for a product than the product is actually suitable for. In addition, in view of the specialized applications and processing problems that are encountered despite the suppliers claims, one skilled in the art can not tell whether a particular resin will be suitable for an application unless tested. However, for various reasons there are frequently drawbacks to the use of many of these polymeric materials. For example, ethylene vinyl alcohol is an excellent oxygen barrier material for use in packaging food products. However, this polymeric material can be affected by moisture that is present in the atmosphere or the packaged product. As a result, it is frequently found that some polymeric materials are better for certain applications than others.

One area where there is a need for suitable resins in film applications is in the area of heat shrinkable films. Heat shrinkable polymeric films are commonly used in packaging meats, particularly primal meat cuts and other large pieces of meat. While this description will detail the usage of films for packaging meat and meat by-products, it will be understood that these films are also suitable for packaging a myriad of other products, both including food products and non-food products.

Some of the films embodying the present invention are intended to be used by meat packers in the form of heat shrinkable bags with one opened end, which bags are closed and sealed after insertion of the meat. After the product is inserted, air is usually evacuated from the package and the open end of the bag is closed. Suitable methods of closing the bag include heat selling, metal clips, adhesives etc. Heat is applied to the bag once sealing is completed to initiate shrinkage of the bag about the meat.

In subsequent processing of the meat, the bag may be opened and the meat removed for further cutting of the meat into user cuts, for example, for retail cuts or for institutional use.

Suitable shrink bags must satisfy a number of criteria. Many bag users seek a bag that is capable of surviving the physical process of filling, evacuating, sealing and heat shrinking. For example, during the shrinking process great stress can be placed on the film by the sharp edges of bone in the meat. The bag must also have sufficient strength to survive the material handling involved in moving the large cuts of meat, which may weigh fifty pounds or more, along the distribution system.

Because many food products including meat deteriorate in the presence of oxygen and/or water, it is desirable that the bags have a barrier to prevent the infusion of deleterious gases and/or the loss or addition of moisture.

Conventional packaging for many products has frequently been made of multiple layer films having at least three layers. These multiple layer films are usually provided with at least one core layer of either an oxygen barrier material such as a vinylidene chloride copolymer, ethylene vinyl alcohol, a nylon or a metal foil preferably aluminum. Heat shrinkable meat bags, for example, have generally used vinylidene chloride copolymers. The copolymer of the vinylidene chloride may, for example, be a copolymer with vinyl chloride or methyl acrylate. Collapsible dispensing tubes have generally used one or more foil layers. The foil layers in addition to supplying an oxygen barrier also provide the dispensing tube with "deadfold", i.e., the property of a collapsible dispensing tube when squeezed to remain in the squeezed position without bouncing back.

Outer layers of films used in packaging food products can be any suitable polymeric material such as linear low density polyethylene, low density polyethylene, ionomers including sodium and zinc ionomers, such as Surlyn®. In conventional shrink bags, the outer layers are generally line low density polyethylene or blends thereof. Suitable outer layers for meat bags are taught by U.S. Pat. No. 4,457,960 to Newsome, the disclosures of which are incorporated herein by reference.

U.S. Pat. No. 4,894,107 to Tse et al. commonly assigned to American National Can discloses novel films and processes for making them. The films are characterized by having first and second layers whose compositions have a significant fraction of ethylene vinyl acetate (EVA). A third layer of vinylidene chloride copolymer (VDC-CP) is disposed between the first and second layers. The composition of at least one of the first and second layers is a blend of 10% by weight to 90% by weight linear low density polyethylene (LLDPE) and 90% to 10% EVA. These polymeric films are useful as heat shrinkable polymeric films. The film may be unoriented or oriented. Oriented films may be optionally cross-linked.

While conventional films have been suitable for many applications, it has been found that there is a need for films that are stronger and more easily processed than conventional films. In meat bags, there is a need for films and bags that have superior toughness and sealability and the ability to undergo cross-linking without undue deterioration. Thus, it is an object of the present invention to provide improved structures, including single and multi-layer films, sheets, lidstock, pouches, tubes and bags. In particular, structures for use in shrink bags wherein the shrink bags are capable of withstanding production stresses and the shrink process.

SUMMARY OF THE INVENTION

The structures of the present invention may be single or multilayer films, sheets, lidstock, pouches, containers, tubes and bags where at least one layer contains a polymer, usually a copolymer, formed by a polymerization reaction in the presence of a single site catalyst such as a metallocene. Examples of such a polymer are ethylene and propylene polymers and copolymers thereof. One preferred copolymer is a copolymer of ethylene and an alpha olefin where such alpha olefin has a carbon chain length of from $C_3-C_{20}$. The structures of the present invention may also include blends of polymers and copolymers formed by a polymerization reaction with a single site catalyst or blends of a polymer and copolymer formed by a polymerization reaction with a single site catalyst and another polymeric material. Examples of suitable polymers for blending include: high and medium density polyethylene (HDPE, MDPE), linear low density polyethylene (LLDPE), low density polyethylene (LDPE), ethylene vinyl acetate (EVA), ultra low density polyethylene (ULDPE or very low density polyethylene VLDPE), and ionomers such as Surlyn®. Polymers made from single site catalyst, preferably metallocene catalysts, provide increased strength, particularly seal, burst, impact and puncture as well as improved optics and faster bag making/sealing speeds.

The present invention may also be a multilayer structure of at least three layers wherein the core layer is a barrier layer. In one embodiment of the present invention, there may be a first outer layer of an ethylene or propylene polymer or copolymer formed by a polymerization reaction in the presence of a single site catalyst, a barrier layer and a second outer layer of a polymeric material. The second outer layer may be an ethylene or propylene polymer or copolymer formed by a polymerization reaction in the presence of a single site catalyst or a layer of another polymeric material such as high density polyethylene, medium density polyethylene, linear low density polyethylene, ultra low density polyethylene, low density polyethylene, ethylene vinyl acetate, an ionomer or blends thereof. The first outer layer may also be a blend of the ethylene copolymer with another suitable polymeric material such as described above. A preferred polymer formed by a single site catalyst is a copolymer of ethylene and an alpha olefin such as 1-octene. Additional layers such as adhesive layers or other polymeric layers may be interposed in the structure between one or both of the outer layers or on top of one or both of the outer layers. The structure of the present invention may be rendered oriented either uniaxially or biaxially and cross-linked by any suitable means, such as for example irradiation or chemical cross-linking.

BRIEF DESCRIPTION OF THE DRAWINGS

FIG. 1 is a side view of a three layer structure of the present invention.

FIG. 2 is a side view of a five layer film of the present invention.

FIGS. 3–6 are examples of the structure of metallocene catalysts which could be-used in the polymerization of the polymer used in the structures of the present invention.

DETAILED DESCRIPTION OF THE INVENTION

The structures of the present invention include films, sheets, lidstock, pouches, containers, tubes and bags. These structures may be a single layer or multi-layer structure. The structures are comprised of polymers that have been polymerized in the presence of a single site catalyst, such as a metallocene. A metallocene is a complex organometallic molecule typically containing zirconium or titanium, with a pair of cyclic alkyl molecules. More specifically, metallocene catalysts are usually compounds with two cyclopentadiene rings fixed to the metal. These catalysts are frequently used with aluminoxanes as a cocatalyst or an activator, one suitable aluminozane is a methaluminoxane (MAO). Besides, titanium and zirconium, hafnium may also be used as the metal to which the cyclopentadiene is bonded. Alternative metallocenes may include Group IVA, VA and VIA transition metals with two cyclopentadiene rings. Also mono- cyclopentadiene rings or shyl amides may alternatively be in the metallocene instead of two cyclopentadienes. Other metals to which the cyclopentadiene may be attached may include the metals in the lanthanide series. FIGS. 3, 4, 5 and 6 show representative metallocenes that are suitable single site catalysts.

While the reaction mechanism is not completely understood, it is believed that the metallocene, single site catalyst confines the copolymerization reaction to a single site over the polymer thus controlling comonomer placement and side chain length and branching. The copolymers formed from metallocene single site catalysts are highly stereo regular products with narrow molecular weight distribution. The metallocenes can be used to polymerize ethylene, propylene, ethylenic and acetylenic monomers, dienes and carbon monoxide. Comonomers with ethylene and propylene include styrene, substituted styrene and 1,4-hexadiene. The metallocene single site catalysts are capable of producing isotactic polymers and syndiotactic polymers, i.e., polymers in which the crystalline branches alternate regularly on both sides of the back bone of the polymer. There are two general types of single site catalyst reactions. The first are stereoselective catalysts reactions which have been developed by Exxon and Dow and which are used to make Exxon's Exact resins and Dow's constrained geometry catalyst technology (CGCT) resins. See FIGS. 3 and 4. The second type of reactions are stereoselective catalysts developed by Hoechst and Fina for stereo specific polymerization particularly of polypropylene and other olefins such as 1-butene and 4-methyl-1-pentene. See, e.g., FIGS. 5 and 6.

The ethylene alpha olefins polymerized by a single site catalyst can have low crystallinity and a density that ranges from 0.854 to 0.97 gm/cc. Although this density range is similar to conventional ethylene polymers, i.e., LDPE, LLDPE and ULDPE, the polymers in the structures of the present invention have a narrow molecular weight distribution and homogeneous branching. The molecular weight distribution of the preferred polymers may be represented by the formula $$MWD=M_w/M_n=<2.5$$

In addition, the melt processability of these polymers ($I_{10}/I_2$) has a range of about 5.5 to about 12 while conventional homogenous polymers are generally less than 6.5 at an MWD of 2. The melt tension of these polymers is in the range of about 1.5 to 3.5 grams.

The MWD of these polymers may be determined using a Water's 150 GPC at 140° C. with linear columns ($103_6$ A-$10_6$ A$_0$) from Polymer Labs and a differential refractometer detector. Comparison of the MWD of a 1MI, 0.920 density CGCT polymer with that of 1MI, 0.920 density conventional LLDPE illustrates the very narrow MWD of the CGCT polymers which usually have a $M_W/M_N$ of approximately 2 compared to 3 or greater for LIDPE.

A preferred ethylene copolymer is a copolymer of ethylene and a $C_3$ to $C_{20}$ alpha olefin. A preferred copolymer is a low modulus ethylene octene copolymer sold by Dow. This copolymer is formed by Dow's constrained-geometry catalyst technology which uses a single site catalyst such as cyclo-pentadienyl titanium complexes. As best understood, Dow's constrained geometry catalysts are based on group IV transition metals that are covalently bonded to a monocyclopentadienyl group bridged with a heteroatom. The bond angle between the monocyclopentadienyl group, the titanium center and the heteroatom is less than 115. When the alpha olefin is present in the copolymer in the range of about 10 to 20% by weight these copolymers are referred to as plastomers. When the percent alpha olefin is greater than 20% these copolymers are called elastomers. The preferred ethylene octene copolymer has the octene comonomer present in an amount less than 25%. Examples of Dow ethylene octene copolymers have the following physical properties.

| DENSITY g/cc | MOLECULAR WEIGHT DISTRIBUTION | MELT INDEX | MELT FLOW RATIO | MELT STRENGTH |
|---|---|---|---|---|
| 0.920 | 1.97 | 1.0 | 9.5 | 1.89 |
| 0.910 | 1.90 | 1.0 | 7.9 | 1.68 |
| 0.902 | 2.10 | 1.0 | 7.6 | 1.68 |

Molecular weight distribution is defined as the ratio of weight average molecular weight to number average molecular weight. The lower the figure, the narrower the molecular weight distribution. Melt flow ratio is defined as the ratio of melt index, as tested with a 10-kg load to the melt index with a 2.168-kg load. The higher the ratio, the more processable the material. Melt strength is defied as melt tension measured in grams. The higher the number the greater the melt strength. Other suitable resins are the Exact resins sold by Exxon, these resins have the following characteristics:

TYPICAL PROPERTIES OF EXACT
MEDICAL GRADE POLYETHYLENES

| PROPERTY | VALUE BY GRADE | | | | | |
|---|---|---|---|---|---|---|
| | 4028 | 4022 | 4021 | 4023 | 4024 | 4027 |
| Melt index (D1238)* | 10 | 6 | 22 | 35 | 38 | 4 |
| Density, g./cc. (D-1505) | 0.880 | 0.890 | 0.885 | 0.882 | 0.885 | 0.895 |
| Hardness (D-2240) | | | | | | |
| Shore A | 78 | 84 | 84 | 80 | 83 | 89 |
| Shore D | 29 | 35 | 36 | 27 | 35 | 39 |
| Tensile strength at break, p.s.i. (D-638) | 2220 | 1700 | 3260 | 620 | 2840 | 2200 |
| Tensile elongation at break, % (D-638) | >800 | >800 | >800 | >800 | >800 | >800 |
| Tensile impact, ft.-lb./sq. in. (D-1822) | 145 | 130 | 350 | 280 | 300 | 340 |
| Flexural modulus, p.s.i. (D-790) | 5040 | 4930 | 3980 | 3100 | 4180 | 7230 |
| Vicat softening point ° F. (D-1525) | 138 | 168 | 158 | 138 | 158 | 181 |

The structure of the present invention is comprised of an ethylene, propylene, or styrene polymer or copolymer formed by a polymerization reaction in the presence of a single site catalyst preferably a metallocene. Ethylene may be copolymerized with any suitable monomer, such as $C_3$–$C_{20}$ alpha olefin including propylene butene-1,4-methy-1-pentene, 1-hexene and 1-octene. A preferred comonomer is 1-octene. The preferred ethylene alpha olefin copolymer of the present invention has a density in the range of 0.880 gm/cc to about 0.920 gm/cc, a more preferred range of 0.890 gm/cc to about 0.915 gm/cc and a most preferred range of about 0.900 gm/cc to about 0.912 gm/cc.

FIG. 1 shows a cross section of a three layer coextruded structure. Layer 14 is the core layer which may be a barrier layer that minimizes the transmission of oxygen through the structure. Preferred barrier materials are polyvinylidene chloride copolymers such as copolymers of vinylidene chloride and vinyl chloride or an alkyl acrylate such as methyl acrylate. Other preferred barrier materials include, ethylene vinyl alcohol, nylon or a metal foil such as aluminum. Layer 14 may also be a copolymer of ethylene and styrene formed using a single site catalyst in the polymerization reaction. In addition, layer 14 may also be a polystyrene formed by a polymerization reaction in the presence of a single site catalyst. One such polystyrene is the crystalline syndiotactic polystyrene sold by Idemitsu Petro Chemical Co., Tokyo, Japan.

On opposite sides of the core layer 14 of FIG. 1 are layers 12 and 16. At least one of these layers 12 is a polymer formed by a polymerization reaction in the presence of a single site catalyst. The remaining layer 16 may be any suitable polymeric material or blends of material such as a polyester, co-polyester, polyamide, polycarbonate, polypropylene, propylene-ethylene copolymer, ethylene-propylene copolymer, combinations of polypropylene and ethylene vinyl acetate copolymer, ultra low density polyethylene, low density polyethylene, medium density polyethylene, high density polyethylene, linear low density polyethylene copolymers, linear medium density polyethylene copolymer, linear high density polyethylene copolymer, ionomer, ethylene acrylic acid copolymer, ethylene ethyl acrylate copolymer, ethylene methyl acrylate copolymer, or ethylene methacrylic acid copolymer.

In an alternate embodiment, the layer 12 may be a blend of a polymer formed by a polymerization reaction in the presence of a single site catalyst and a suitable polymeric material such as is identified in connection with the description of layer 16 above.

As seen in FIG. 2, the structure may also include embodiments which have a fourth layer 28 over the first layer 22 and a fifth polymeric layer 30 over the third layer 26. The composition of the fourth layer 28 may be selected from the same group of materials from which the composition of the first layer 12 or third layer 16 is selected, and the fifth layer 30 may also be the same composition as the first layer 22 or the third layer 26.

In an alternate embodiment of FIG. 2, the five layer structure may have a first layer 28 similar in composition to layer 12 of FIG. 1, i.e., the film may have a first layer of a polymer formed by the polymerization reaction with a single site catalyst or blends thereof with another suitable polymeric material. One or both of the second 22 and fourth 26 layers may be an adhesive layer.

The composition of adhesive layers 22 and 26 is selected for its capability to bond the core or barrier layer 24 to the surface layers 28 and 30. A variety of the well known extrudable adhesive polymers adhere well to the core or barrier layer 24. Thus, if for example layer 30 is a polypropylene, an adhesive polymer based on polypropylene is desirably selected for layer 26. Examples of such adhesives are the extrudable polymers available under the trade designations Admer QF-500, QF550, of QF-551 from Mitsui Petrochemical Company, or Exxon 5610A2.

If the composition of layer 23 or 30 is an ethylene based polymer or copolymer, an adhesive polymer based on ethylene is preferably selected for layer 22, including ethylene homopolymer and copolymers. Such a preferred adhesive composition is an ethylene vinyl acetate copolymer (EVA) containing up to 25% to 30% by weight vinyl acetate. Other ethylene based homopolymer and copolymers, modified to enhance adhesion operties are well known under the trade names of, for example, Bynel and Plexar. Typical base polymers for these extrudable adhesives are the polyethylene LLDPE and the ethylene vinyl acetate copolymers. Such adhesive polymers, including the polypropylene-based polymers, are typically modified with carboxyl groups such as anhydride. Also acceptable as adhesives are ethylene methyl acrylate copolymers (EMA).

Additional layers may also be present in the structures of the present invention. For example, the present invention contemplates 4, 6, 7, 8, and higher numbers of layers in the film of the present invention and different combinations of layer structures may also be present. For example, there may be more than one barrier layer, i.e., two layers of polyvinylidene chloride copolymers, two layers of foil or two layers of ethylene vinyl alcohol (EVOH) or nylon. Alternatively, this may be a layer of EVOH and a layer of a polyvinylidene chloride copolymer or a polyamide or a polystyrene and other combinations of the core materials. The additional layers of the present invention also encompass more than one polymer formed by the polymerization reaction in the presence of a single site catalyst. The polymers may be in a layer alone or in the form of a blend. Suitable polymers for blending with an ethylene polymer formed in a polymerization reaction with a single site catalyst include other ethylene polymers formed in a polymerization reaction with a single site catalyst, low density polyethylene (LDPE), linear low density polyethylene (LLDPE), ultra low density polyethylene (ULDPE), EVA, ionomers, ethylene copolymers, ethylene methyl acrylate (EMA), ethylene acrylic acid (EAA), ethyl methyl acrylic acid (EMAA), polypropylene (PP), ethylene normal butyl acrylate (ENBA), ethylene propylene copolymers (PPE). Suitable polymers for blending with a propylene polymers formed in a polymerization reaction with a single site catalyst include ethylene propylene copolymers.

Preferred blends using EVA's are those having lower vinyl acetate (VA) content as they tend to yield EVA layers having better hot strength. EVA's having higher VA content tend to yield EVA layers having increased adhesion to for example, the vinylidene chloride copolymer layer. EVA's having virtually any amount of VA will have better adhesion to the vinylidene chloride copolymer layer than an ethylene homopolymer. However, good interlayer adhesion is considered desirable in the invention, and thus, steps are usually taken to enhance adhesion where no unacceptable negative effect is encountered. Thus, higher VA contents, in the range of 6% to 12% vinyl acetate are preferred, a melt index of less than 1 is also preferred. While blend amounts are shown herein in weight percent, VA contents are mole percent. Especially preferred EVA's have VA content of 7% to 9% and melt index of 0.2 to 0.8. Blends of EVA's to make up the EVA component of layers 16 and 18 are acceptable.

Preferred structures of the present invention are represented by a multiple layer polymeric film having five layers wherein one of the five layers is composed of vinylidene chloride methyl acrylate.

In a preferred embodiment of the present invention, the multiple layer polymer film comprises a first layer, the composition of said first layer comprising a blend of an ethylene vinyl acetate copolymer; linear low density polyethylene; a second ethylene vinyl acetate copolymer; and slip; a second layer, the composition of said second layer comprising ethylene vinyl acetate and wherein each first and second layer having two surfaces; a third layer, the composition of said third layer comprising vinylidene chloride methyl acrylate and wherein said third layer is disposed between said first and second layer; a fourth layer, the composition of said fourth layer being the same as said first layer wherein said fourth layer is adhered to said first layer on the surface opposite said third layer; and a fifth layer, the composition of said fifth layer comprising a blend of linear low density polyethylene and low density polyethylene wherein said fifth layer is adhered to said second layer on the surface opposite said third layer.

In a further preferred embodiment of the present invention, the first layer of the multiple layer polymeric film is a blend of 80% by weight of ethylene vinyl acetate copolymer; 10% by weight of linear low density polyethylene; 9.65% by weight of a second ethylene vinyl acetate copolymer; and 0.35% by weight of slip.

The second layer of the multiple, five layer polymeric film is 100% by weight of ethylene vinyl acetate copolymer.

The third layer of the multiple polymeric film is 98.1% by weight of vinylidene chloride methyl acrylate and 1.9% by weight of additives.

The fourth layer of the multiple layer polymeric film is a blend of 80% by weight of ethylene vinyl acetate copolymer; 10% by weight of linear low density polyethylene; 9.65% by weight of a second ethylene vinyl acetate copolymer; and 0.35% by weight of slip.

The fifth layer of the multiple, five layer polymeric film is a blend of 90% by weight of linear low density polyethylene and 10% by weight of low density polyethylene.

In the preferred embodiments of the present invention, the composition of the first and fourth layers are 80% ethylene vinyl acetate (EVA); 10% by weight of linear low density polyethylene; 9.65% by weight of a second ethylene vinyl acetate copolymer; and 0.35% by weight of slip. Ethylene vinyl acetate resins suitable for the practice of this invention are exemplified by ESCORENE® (LD-318) and ESCORENE® (LD-712) from Exxon Chemical.

EXCORENE® LD-318 is a 9.0% vinyl acetate copolymer film resin. This resin has the following properties:

| Resin Properties | ASTM Method | Units (SI) | Typical Value[2] |
|---|---|---|---|
| Melt Index | Exxon Method | g/10 min. | 2.0 |
| Density | Exxon Method | g/cm$^3$ | 0.930 |
| Vinyl Acetate | Exxon Method | % by wt. | 9.0 |
| Melting Point | Exxon Method | °F. (°C.) | 210 (99) |

ESCORENE® LD-712 is a 10.0% vinyl acetate copolymer film resin. This resin has the following properties:

| Resin Properties | ASTM Method | Units (SI) | Typical Value[3] |
|---|---|---|---|
| Melt Index | Exxon Method | g/10 min. | 0.35 |
| Density | Exxon Method | g/cm$^3$ | 0.931 |
| Vinyl Acetate | Exxon Method | % by wt. | 10 |
| Melting Point | Exxon Method | °F. (°C.) | 207 (97) |

ESCORENE® LD-318 is suitable for the 9.65% of EVA of layers one and four and ESCORENE® LD-712 is suitable for the remaining ethylene vinyl acetate of layers one, two and four.

Linear low density polyethylene resin suitable for the practice of this invention is exemplified by DOWLEX® 2267A and DOWLEX® 2247A from Dow Chemical Company.

DOWLEX® 2267A has the following properties:

| Physical Properties | ASTM Method | Values[1]:English (SI) |
|---|---|---|
| Resin Properties | | |
| Melt Index, gm/10 min | D 1238 | 0.85 |
| Density, gm/cc | D 792 | 0.917 |
| Vicat Softening Point, °F. (°C.) | D 1525 | 208 (98) |

DOWLEX® 2247A has the following properties:

| Physical Properties | ASTM Method | Values[1]:English (SI) |
|---|---|---|
| Resin Properties | | |
| Melt Index, gm/10 min | D 1238 | 2.3 |
| Density, gm/cc | D 792 | 0.917 |
| Vicat Softening Point, °F. (°C.) | D 1525 | 210 (99) |

Alternatively, Exxon's EXCEED® 363C32 linear low density polyethylene resin may also be used in the structure of the present invention. EXCEED® 363C32 has the following properties:

| Resin properties[1] | Units (SI) | Typical Value[3] |
|---|---|---|
| Melt Index | g/10 min. | 2.5 |
| Density | g/cm$^3$ | 0.917 |
| Melting Point | °F. (°C.) | 239 (115) |

In the preferred embodiment of the present invention, the low density polyethylene resin suitable for the practice of this invention is exemplified by PETROTHENE® NA204-000 from Equistar Chemicals, L.P. PETROTHENE® has the following properties:

| | Value | Units | ASTM Test Method |
|---|---|---|---|
| Density | 0.918 | g/cm$^3$ | D1505 |
| Melt Index | 7.0 | g/10 min. | D 1238 |
| Melt Point | 106.5 | °C. | |

The polyvinylidene chloride methyl acrylate copolymer polymer of the present invention contains between 3 mole percent and 20 mole percent of methyl acrylate. These more preferred copolymers have 6 to 12 mole percent methyl acrylate. Additives typically used with vinylidene chloride copolymers may be used in conventional amounts which would be known to one skilled in the art. Said additives are exemplified by ethylene vinyl acetate, dibutylsebacate, magnesium oxide, stearamide, and epoxidized soy bean oil.

Slip is a coefficient of friction additive which is selected from erucamide and other fatty acid amides.

The structure of the present invention may be formed by any conventional process. Such processes include extrusion, coextrusion, extrusion coating, extrusion lamination, adhesive lamination and the like, and combinations of processes. The specific process or processes for making a given film which is neither oriented nor cross-linked can be selected with average skill, once the desired structure and compositions have been determined.

When the structure of the present invention is a film, the film may also be oriented either uniaxially or biaxially. Orientation can also be done by any conventional process for forming multiple layer films. A preferred process includes the steps of coextrusion of the layers to be oriented, followed by orientation in one of the conventional processes such as blown tubular orientation or stretch orientation in the form of a continuous sheet; both being molecular orientation processes. The double bubble technique disclosure in Pahlke, U.S. Pat. No. 3,456,044 is suitable for use in producing the film of this invention. The films may also be formed by a tubular water quench process. In this process the film may be extruded downwardly as a tube formed by an annular die, and carried into a water quench tank, generally with a cascade of water on the outside surface providing initial cooling. The flattened tape is withdrawn from the quench bath, is reheated (normally in a second water bath) to its orientation temperature, is stretched in the machine direction between two sets of rolls that are so rotated as to establish a linear rate differential therebetween, and is simultaneously oriented in the transverse, or cross-machine, direction as an inflated bubble trapped between the nips of the rolls. In accordance with conventional practice, the film will usually be cooled by air in the orientation zone.

The film of the present invention may also be oriented and/or cross-linked. The first step is the formation of a multiple layer film. The formation of the multiple layer film, is usually most easily accomplished by coextrusion of the desired layers. Other formation processes are acceptable so long as the resulting oriented film at the conclusion of fabrication processing is a unitary structure.

The second step is orienting the multiple layer film. One method for accomplishing orientation is by heating the film to a temperature appropriate to molecular orientation and molecularly orienting it. The film may then be optionally heat set by holding it at an elevated temperature while its dimensions are maintained. The orientation step is preferentially carried out in line with the first step, which is the film formation step of the process.

The third step is subjecting the formed and oriented multiple layer film, to electron beam irradiation.

The amount of electron beam irradiation is adjusted, depending on the make-up of the specific film to be treated and the end use requirement. While virtually any amount of irradiation will induce some cross-linking, a minimum level of at least 1.0 megarads is usually preferred in order to achieve desired levels of enhancement of the hot strength of the film and to expand the range of temperature at which satisfactory heat seals may be formed. While treatment up to about 50 megarads can be tolerated, there is usually no need to use more than 10 megarads, so this is a preferred upper level of treatment the most preferred dosage being 2 to 5 megarads.

The third step of subjecting the film to electron beam irradiation is performed only after the multiple layer film has been formed, and after molecular orientation, in those embodiments where the film is molecularly oriented. It should be noted that, in the irradiation step, all of the layers in the film are exposed simultaneously to the irradiation sources, such that irradiation of all the layers of the film takes place simultaneously.

In one embodiment of the process, the second step of orientation may be omitted and the unoriented multiple layer film may be cross-linked by irradiation treatment to produce a cross-linked, unoriented, multiple layer film.

Multilayer heat shrinkage films of the present invention may also contain an optical brightner. The films which contain an optical brightner counteract the effects of yellowing in the oxygen barrier material of the multilayer heat shrinkable films.

In a still preferred embodiment of the heat shrinkable films, the multiple layer polymer film comprises a first layer, the composition of said first layer comprising a blend of an ethylene vinyl acetate copolymer; linear low density polyethylene; a second ethylene vinyl acetate copolymer; and slip; a second layer, the composition of said second layer comprising ethylene vinyl acetate and wherein each first and second layer having two surfaces; a third layer, the composition of said third layer comprising vinylidene chloride methyl acrylate wherein a violet pigment is incorporated into the vinylidene chloride methyl acrylate copolymer layer and wherein said third layer is disposed between said first and second layer; a fourth layer, the composition of said fourth layer being the same as said first layer wherein said fourth layer is adhered to said first layer on the surface opposite said third layer; and a fifth layer, the composition of said fifth layer comprising a blend of linear low density polyethylene and low density polyethylene wherein said fifth layer is adhered to said second layer on the surface opposite said third layer.

As used herein, "violet tint" means a color within the visible light spectrum which is characterized by a wavelength range of from about 380 to about 440 nanometers.

The multilayer heat shrinkable films which contain a colored pigment, specifically a violet pigment, are manufactured by incorporation of the violet pigment into the barrier layer of the film. In a preferred embodiment, the violet pigment is incorporated into vinylidene-chloride-methyl acrylate copolymer layer.

For ease in manufacturing the pigmented layer of film, the pigment is used dispersed in a polymeric material. These polymeric concentrates may be prepared by using any suitable method for dispersing solid materials in polymers. Extrusion and milling are examples of such methods. Generally, the polymeric material which is selected for the dispersement of the pigment is compatible with the polymeric material which is selected for the film layer. Therefore, the polymeric material which functions as the dispersing agent must be dispersible into the film layer into which it is incorporated.

For the purpose of this invention, a polymeric concentrate may contain pigment in an amount of 300 ppm to 800 ppm, based on the total weight of the pigment and polymeric material combined.

Pigment may be incorporated into a film by combining the polymeric concentrate which contains the pigment with the feed material of one or more film layers by any suitable mixing methods. The amount of polymeric concentrate incorporated into a given film layer will depend on many factors. These factors include but are not limited to: the number of layers into which the pigment will be incorporated, the polyvinylidene chloride copolymer content of the film, and the degree of thermal and/or radiation exposure said polyvinylidene chloride copolymer is subjected to. A film should contain sufficient pigment to provide a film which despite exposure of the polyvinylidene chloride copolymer layer to radiation levels from 2.0 megarad to 6.0 megarads, retains an acceptable violet tint.

In a preferred embodiment, the vinylidene chloride methyl acrylate copolymer layer contains a substituted anthraquinone in an amount of 5 to 15 ppm based on the total weight of the vinylidene chloride methyl acrylate copolymer present.

A substituted anthraquinone suitable for use is 1-hydroxy4-anilino-9,10- anthraquinone having the following structural formula:

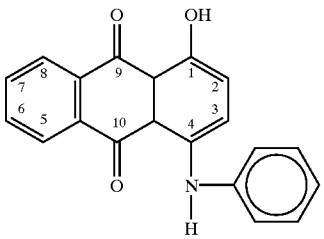

EXAMPLES

Multilayer films may be prepared according to the present invention. Biaxially stretched three layer films may be prepared by a "double bubble" process similar to that disclosed in U.S. Pat. No. 3,456,044 by coextruding the following compositions through a multilayer die, biaxially stretching the coextruded primary tube. The films may also be irradiated if desired.

EXAMPLE 1

Layer 1 - Copolymer of ethylene and an alpha olefin such as 1-Hexene or 1-Octene formed by the polymerization reaction in the presence of a single site catalyst or metallocene (hereinafter CEO)
Layer 2 - Vinylidene chloride - methyl acrylate (VDC-MA) copolymer
Layer 3 - Polyolefin. This film may be biaxally stretched and if necessary irradiated.

|  | EXAMPLE 2 | EXAMPLE 3 | EXAMPLE 4 |
|---|---|---|---|
| Layer 1 | CEO | CEO | CEO-EVA blend |
| Layer 2 | VDC-MA | VDC-MA | VDC-MA |
| Layer 3 | ULDPE-EVA blend | CEO | CEO-EVA blend |

|  | EXAMPLE 5 | EXAMPLE 6 | EXAMPLE 7 |
|---|---|---|---|
| LAYER 1 | CEO | CEO | CEO-EVA blend |
| LAYER 2 | Nylon | Nylon | Nylon |
| LAYER 3 | CEO | ULDPE-EVA | CEO-EVA blend |

|  | EXAMPLE 8 | EXAMPLE 9 |
|---|---|---|
| LAYER 1 | Polyolefin | Polyolefin |
| LAYER 2 | Styrene copolymer formed by the polymerization reaction with a single site catalyst | Propylene copolymer formed by the Polymerization reaction with a single site catalyst |
| LAYER 3 | Polyolefin | Polyolefin |

|  | EXAMPLE 10 | EXAMPLE 11 | EXAMPLE 12 |
|---|---|---|---|
| LAYER 1 | CEO | CEO | CEO-EVA Blend |
| LAYER 2 | CEO | EVOH | EVOH |
| LAYER 3 | CEO | ULDPE-EVA Blend | CEO-EVA Blend |

|  | EXAMPLE 13 | EXAMPLE 14 | EXAMPLE 15 |
|---|---|---|---|
| LAYER 1 | CEO | CEO | CEO-EVA Blend |
| LAYER 2 | Tie | Tie | Tie |
| LAYER 3 | PVDC Copolymer or EVOH | PVDC Copolymer or EVOH | PVDC Copolymer or EVOH |
| LAYER 4 | Tie | Tie | Tie |
| LAYER 5 | ULDPE-EVA Blend | CEO | CEO-EVA Blend |

|  | EXAMPLE 16 |
|---|---|
| LAYER 1 | EVA-ULDPE |
| LAYER 2 | ULDPE or CEO |

| | |
|---|---|
| LAYER 3 | PVDC Copolymer or EVOH |
| LAYER 4 | EVA |
| LAYER 5 | CEO or blend of CEO and EVA |

The following examples may also be prepared in accordance with the present invention:

| Meat Film - Forming Web Formed by TWQ Process (Tubular Water Quench Process) | |
|---|---|
| LAYER 1 | Nylon |
| LAYER 2 | Tie |
| LAYER 3 | EVOH |
| LAYER 4 | Tie |
| LAYER 5 | CEH or CEO |

CEH is a copolymer of ethylene and 1-Hexene formed by the polymerization reaction in the presence of a single site catalyst or a metallocene. Other alpha olefins can be polymerized with the ethylene also.

| LAYER 1 | HDPE |
|---|---|
| LAYER 2 | Blend of CEH or CEO and EVA and polybutylene |
| LAYER 1 | HDPE |
| LAYER 2 | CEH or CEO and polybutylene |
| LAYER 1 | HDPE |
| LAYER 2 | CEH or CEO |

| LAYER 1 | PVDC coated PET |
|---|---|
| LAYER 2 | Adhesive (lamination) |
| LAYER 3 | CEO or CEH |

This film may be formed by adhesive laminating a film formed of a copolymer of ethylene and an alpha olefin with the PVDC coated PET film.

| LAYER 1 | PVDC coated PET |
|---|---|
| LAYER 2 | LDPE - extrusion laminated |
| LAYER 3 | LDPE/CEH or CEO coextrusion |

This film can be formed by extrusion laminating a film of PVDC coated PET or LDPE.

Example 23

Layer 1—Blend of two or more copolymers of ethylene and an alpha olefin polymerized in the presence of a single site catalyst or metallocene such as CEO with either CEH or CEB. CEB is a copolymer of ethylene and butene-1 formed by a polymerization reaction in the presence of a single site catalyst or a metallocene.

Example 24

Layer 1—Blend of a copolymer of ethylene and an alpha olefin formed by a polymerization reaction in the presence of a single site catalyst or a metallocene with Polyethylene or other polyolefin such as EVA, EMA, FAA, EMAA, ionomers, ENBA, PP or PPE.

The films of example 23 and 24 can either be single layer fins or multi layer films where additional layers are present on layer 1.

Example 25

A four layer film was coextruded at a total caliper of 2.1, 2.3, 2.5 or 3.0 mil. depending upon the end use requirements. The outer two layers of the film are the same and a blend of EVA, LLDPE, and slip. The 80% EVA was Exxon LD 712.06, the 9.65% EVA Exxon LD 318.92, the 10% LLDPE Dow 2267A-1 and the 0.35% slip Reed Spectrum 1080823 U slip. The core layer was 0.20 mil which was positioned between the two outer layers and the two inner layers was vinylidene chloride-methyl acrylate copolymer blended with appropriate plasticizers, stabilizers lubricants. The one inner layer positioned next to the core layer was 100% Exxon EVA LD 712.06. The inner most layer (sealant layer) was 90% Dow LLDPE 2247A-1 and 10% Equistar LDPE NA 204-000. The thus coextruded film was heated to orientation temperature via a hot water bath (98° C.) and biaxially oriented at a stretch ratio of 3.8×2.7/1. After orientation, the film was treated with 4.6 megarads of electron beam irradiation and fabricated into bags for the use in packaging various cuts of fresh and processed meat products. The bags were heat sealed on commercial 8300 and 8600 rotary evacuator-sealer equipment available from the Cryovac division of W.R. Grace and Company.

We claim:

1. A multiple layer polymer film, comprising:

a first layer, the composition of said first layer comprising a blend of an ethylene vinyl acetate copolymer; linear low density polyethylene; a second ethylene vinyl acetate copolymer and slip additive;

a second layer, the composition of said second layer comprising ethylene vinyl acetate copolymer and wherein each first and second layer having two surfaces;

a third layer, the composition of said third layer comprising vinylidene chloride methyl acrylate copolymer and wherein said third layer is disposed between said first and second layer;

a fourth layer, the composition of said fourth layer being the same as said first layer wherein said fourth layer is adhered to said first layer on the surface opposite said third layer; and a fifth layer, the composition of said fifth layer comprising a blend of linear low density polyethylene and low density polyethylene wherein said fifth layer is adhered to said second layer on the surface opposite said third layer wherein at least one of said linear low density polyethylene is a metallocene-derived catalyzed linear low density polyethylene.

2. A molecularly oriented multiple layer polymeric film comprising:

a first layer, the composition of said first layer comprising a blend of an ethylene vinyl acetate copolymer; linear low density polyethylene; a second ethylene vinyl acetate copolymer; and slip additive;

a second layer, the composition of said second layer comprising ethylene vinyl acetate copolymer and wherein each first and second layer having two surfaces;

a third layer, the composition of said third layer comprising vinylidene chloride methyl acrylate copolymer and wherein said third layer is disposed between said first and second layer;

a fourth layer, the composition of said fourth layer being the same as said first layer wherein said fourth layer is adhered to said first layer on the surface opposite said third layer; and a fifth layer, the composition of said fifth layer comprising a blend of linear low density polyethylene and low density polyethylene wherein said fifth layer is adhered to said second layer on the surface opposite said third layer wherein at least one of said linear low density polyethylene is a metallocene-catalyzed linear low density polyethylene.

3. A multiple layer polymeric film comprising:

a first layer copolymer, the composition of said first layer comprising a blend of 80% by weight ethylene vinyl acetate copolymer, 10% by weight of linear low density polyethylene; 9.65% by weight of a second ethylene vinyl acetate copolymer; and 0.35% by weight of slip additive;

a second layer, the composition of said second layer comprising 100% ethylene vinyl acetate copolymer and wherein each first and second layer having two surfaces;

a third layer, the composition of said third layer comprising 100% vinylidene chloride methyl acrylate copolymer and wherein said third layer is disposed between said first and second layer;

a fourth layer, the composition of said fourth layer being the same as said first layer wherein said fourth layer is adhered to said first layer on the surface opposite said third layer; and a fifth layer, the composition of said fifth layer comprising a blend of 90% linear low density polyethylene and 10% by weight of low density polyethylene wherein said fifth layer is adhered to said second layer on the surface opposite said third layer wherein at least one of said linear low density polyethylene is a metallocene-derived catalyzed linear low density polyethylene.

4. A multiple layer polymer film, comprising:

a first layer, the composition of said first layer comprising a blend of an ethylene vinyl acetate copolymer; linear low density polyethylene; a second ethylene vinyl acetate copolymer and slip additive;

a second layer, the composition of said second layer comprising ethylene vinyl acetate copolymer and wherein each first and second layer having two surfaces;

a third layer, the composition of said third layer comprising vinylidene chloride methyl acrylate copolymer and wherein said third layer is disposed between said first and second layer;

a fourth layer, the composition of said fourth layer being the same as said first layer wherein said fourth layer is adhered to said first layer on the surface opposite said third layer; and a fifth layer, the composition of said fifth layer comprising a blend of linear low density polyethylene and low density polyethylene wherein said fifth layer is adhered to said second layer on the surface opposite said third layer wherein the linear low density polyethylene resin of layers one, four and five is a metallocene-derived catalyzed linear low density polyethylene.

5. A method for producing a multiple layer film and for producing a bag from said multiple layer film, the method comprising the steps of:

coextruding said multiple layer film wherein said film comprises:

a first layer, comprising a blend of an ethylene vinyl acetate copolymer, linear low density polyethylene, a second ethylene vinyl acetate copolymer and slip additive;

a second layer, comprising ethylene vinyl acetate copolymer and wherein each first and second layer having two surfaces;

a third layer, comprising vinylidene chloride methyl acrylate copolymer and wherein said third layer is disposed between said first and second layer a fourth layer, the composition of said fourth layer being the same as said first layer wherein said fourth layer is adhered to said first layer on the surface opposite said third layer; and a fifth layer, comprising a blend of linear low density polyethylene and low density polyethylene wherein said fifth layer is adhered to said second layer on the surface opposite said third layer and wherein at least one of said linear low density polyethylene is a metallocene-catalyzed linear low density polyethylene;

heating said coextruded film to orientation temperature via a hot water bath;

biaxially orienting said coextruded film;

irradiating said coextruding film; and fabricating portions of said coextruded film into bags.

6. The method according to claim 5 wherein the first layer comprises about 80% of the first ethylene vinyl acetate copolymer, about 9.65% of the second ethylene vinyl acetate copolymer, about 10% of linear low density polyethylene and about 0.35% of the slip additive.

7. The method according to claim 5 wherein said fifth layer comprises about 90% linear low density polyethylene and about 10% low density polyethylene.

8. The method according to claim 5 wherein the film is irradiated at 4.6 megarads of electron beam irradiation.

* * * * *